Sept. 26, 1967    A. L. FREEDLANDER ET AL    3,343,351
FLEXIBLE LAWN MOWER BLADE
Filed Sept. 14, 1966
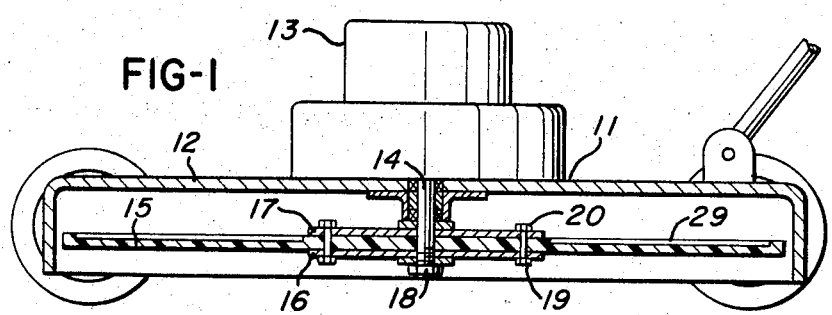
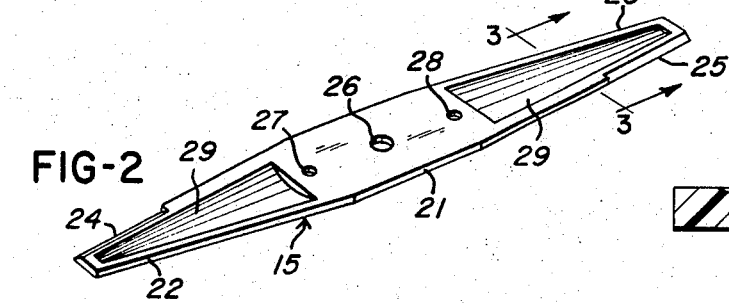
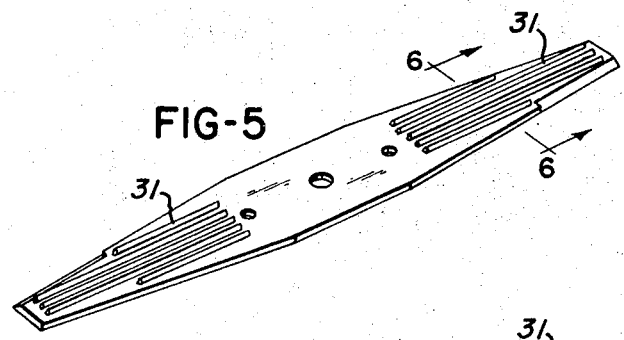
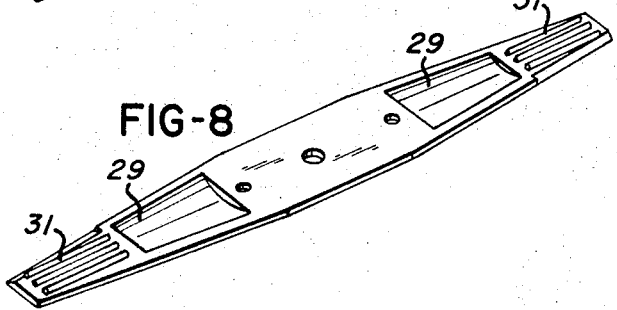
*INVENTORS*
ABRAHAM L. FREEDLANDER
ROBERT E. MATTHEWS
WAYNE C. GARRETT
BY
*Reuben Wolk*
ATTORNEY

United States Patent Office 3,343,351
Patented Sept. 26, 1967

3,343,351
FLEXIBLE LAWN MOWER BLADE
Abraham L. Freedlander, Dayton, Ohio, and Robert E. Matthews and Wayne C. Garrett, Waynesville, N.C., assignors to Dayco Corporation, Dayton, Ohio, a corporation of Delaware
Filed Sept. 14, 1966, Ser. No. 579,434
4 Claims. (Cl. 56—295)

ABSTRACT OF THE DISCLOSURE

A flexible elastomeric safety lawn mower blade for a power driven rotary lawn mower. The blade is made of a material such as a urethane elastomer and has grooves or ridges on at least one non-cutting surface, the combination providing flexibility that minimizes injury when striking a shoe, human limb, or similar object.

---

Conventional lawn mowers used by the average homeowner are usually rotary and are gasoline or electric motor operated. This type of mower is also popular for industrial mowing operations. The term "rotary" refers to a mower in which the shaft extends vertically downward from the housing and upon which the blade is mounted so that it rotates in a plane parallel to the ground. This type of mower is popular because it is simple to operate, inexpensive to build, and performs a highly satisfactory job of cutting grass and weeds. Unfortunately, however, the extremely high speeds at which such mowers operate, up to 3600 r.p.m., cause the blades to create extremely high hazards. For example, there have been many cases known where the operator's foot has accidentally slipped under the housing and has been struck by the rotating blade, causing serious injury to, and even amputation of, the foot. In addition, the conventional metal cutting blade may strike large rocks, posts, or other objects in the lawn, and the sudden shock may cause the blade to break, hurling pieces of metal at tremendous speeds to cause injury to the operator or to the persons close by. In the case of loose stones and other obstructions, these objects are also often struck by a rigid metal blade and caused to be thrown great distances to create damage to persons or property. A further disadvantage of the conventional metal blade used in the rotary mower is that it becomes dull very quickly and must be resharpened for proper efficiency.

The present invention is designed to overcome the many disadvantages recited above, while at the same time retaining the advantages of the rotary type blade. The invention utilizes a blade having arms somewhat similar to those of a metal blade, but made of an elastomeric material that is sufficiently rigid to cut grass as efficiently as a metal blade, and yet sufficiently flexible to permit the blade to flex when striking an object such as a shoe. This flexing action permits the blade to ride over the object and thus avoid serious damage to the foot. This flexing is also useful if an immovable object, such as a large rock or post, is encountered, since the blade is still permitted to flex and ride over this object; at the same time, the blade has a certain amount of inherent elasticity that tends to cushion the initial shock and prevent the blade from breaking. In the case of small rocks, etc., the flexing action will somewhat cushion the initial impact and reduce the amount of speed at which these small objects are hurled. The novel blade also has the property of being able to flex repeatedly without destroying any of its properties, and also retains a cutting edge a remarkably long time. The material utilized also has the properties of elongating only a very small amount during operation and yet has sufficient elastic memory to return to its original size despite many hours of use. Despite the fact that it is elastomeric, the blade itself does not get softer during operation, but retains its initial properties that provide an excellent compromise between sufficient rigidity for cutting and sufficient flexibility for safety. The blade is also extremely simple to manufacture and very low in cost.

In our application filed on even date herewith, Ser. No. 579,304, we have described an invention relating to a blade formed of a non-reinforced homogeneous flexible elastomeric material. The present invention relates to a somewhat different form of this blade, having additional properties of flexibility, and thus represents a different form of blade.

It is a principal object of this invention to provide a lawn mower blade that minimizes the possibility of personal injury.

It is a further object to provide such a blade which is inexpensive and simple to manufacture.

It is a further object to provide a blade which retains its cutting edge for a long period of time.

Other objects of the invention will be readily apparent in the following description and as shown in the accompanying drawings, in which:

FIGURE 1 is a side elevational view of a typical lawn mower in partial section.

FIGURE 2 is a perspective view of a novel blade in accordance with the invention.

FIGURE 3 is a cross section of the blade taken along lines 3—3 of FIGURE 2.

FIGURE 4 is a view similar to FIGURE 3 illustrating a modified form of the invention.

FIGURE 5 is a perspective view of a modified form of the blade.

FIGURE 6 is a cross section of the blade taken along lines 6—6 of FIGURE 5.

FIGURE 7 is a view similar to FIGURE 6 illustrating a further modified form of the blade.

FIGURE 8 is a perspective view of a further modified form of the blade.

Referring now to the drawings, FIGURE 1 illustrates a conventional lawn mower 11 having a housing 12 upon which is mounted a motor 13 having a shaft 14 extending downwardly through the housing. Mounted on the shaft is the blade 15 which is actually secured by the use of a pair of adapters 16 and 17 which may be made of metal or rigid plastic material. The shaft 14 extends through the blade and adapters and is secured thereto by means of a nut 18. The blade and adapters are assembled by means of screws 19 and 20.

The blade 15 as shown in FIGURE 2 is made of a single layer of material, and has a central portion 21 with a maximum width in the region of the center, tapering inwardly to its outer edges and terminating in two arms 22 and 23. At this point the edge portions are approximately one-half the width of the central portion. The outermost edge portions designated as 24 and 25 are beveled at one side, providing a sharpened cutting edge. However, it is also possible to bevel both the leading and trailing edges to permit the blade to be turned upside down and used in the opposite direction as well. A central aperture 26 is used for mounting on the shaft and smaller mounting holes 27 and 28 located within the central portion are used for mounting to the adapters as shown.

It has been proposed in the prior art to use flexible or elastomeric materials as, for example, illustrated in the patent to Tatum No. 3,133,398 and the patent to Voigt No. 3,104,510. In both of these cases the inventor primarily contemplated rubber materials but included additional material to avoid undesirable elongation of the elastomer, and to provide stiffness thereto. For example, Tatum utilized a wire screen or small particles such as stones in order to maintain the integrity of the body. Voigt included fabric layers for the same purpose. Applicants, however, have found that unexpectedly high results can be obtained by certain types of elastomeric materials without the necessity of adding wire screens, particles, fabric, or cords, and as a result the present invention contemplates a non-reinforced blade which is composed entirely of a flexible elastomeric material and has no other material included. A preferred material is a urethane elastomer of the type which is adapted to be cast and which is formulated from a polyester based isocyanate terminated prepolymer. This material is formed through a chain extension with selected polyols or other polyfunctional active hydrogen materials and has been found to provide the necessary physical and mechanical characteristics. The material may be used in a wide range from 90 Shore A to 70 Shore D and has the following characteristics:

| Hardness | 90-95 A | 50-55 D | 65-70 D |
| --- | --- | --- | --- |
| Tensile Strength, p.s.i. | 4,000-5,000 | 5,000-6,000 | 3,500-4,500 |
| Tear Strength, p.l.i. | 300-400 | 600-700 | 500-650 |

This material has been found to have a very low elongation. For example, a lawn mower blade 19 in. long has been found to elongate only ¾ in. during operation at 3600 r.p.m., thus giving us an elongation of less than five percent. This material also has excellent elastic memory, so that the blade will always return to its initial length after conclusion of the operation. The blade manufactured of this material will thus have sufficient structural integrity to provide the necessary job of cutting the grass, and yet will have sufficient flexibility to yield when striking extraneous objects such as a shoe, a rock, or a post, and will both glide over the object and have a certain amount of cushioning effect so that neither the object nor the blade will be damaged. It is important to remember that this is accomplished without the use of any reinforcing materials whatsoever so that the blade is completely homogeneous.

To this point the novel blade described is similar to the one described and claimed in our copending application entitled "LAWN MOWER BLADE" and filed on even date herewith, Ser. No. 579,304. However, the blade of the present application differs in that it contains various modifications which are designed to still further improve the flexibility of the blade. This may be necessary because in certain types of lawns the grass may not be as stiff and resistant to cutting, and may, therefore, permit a more highly flexible blade which would thus provide still further margins of safety when striking foreign objects. The blade illustrated in FIGURE 2, for example, has a groove or depressed section 29 in the upper or non-cutting surface of each arm, this groove having a depth of approximately ⅛ in. and extending almost to the edges of the blade. The grooves also extend toward the center of the blade for approximately one-fourth of the overall length thereof. It is also possible to have a similar groove 30 on the lower surface of the blades as illustrated in FIGURE 4, which still further enhances the flexibility thereof.

It is also possible to improve flexibility in the blade by reducing the thickness of the blade and providing a series of longitudinally extending ridges which are illustrated in FIGURE 5. These ridges extend upwardly on the surface of the blade for approximately 1/16 in. as shown in FIGURE 6, but may also similarly extend below the blade as shown in FIGURE 7. In either case it is possible to achieve a blade having equivalent strength and flexibility and yet by forming it of thinner material to enhance the overall flexibility. As a further modification, the blade may have both grooves 29 and ridges 31, as shown in FIGURE 8, these grooves and ridges located on one or both of the non-cutting surfaces.

Other modifications are contemplated as falling within the scope of the invention.

We claim:

1. In a lawn mower having a rotatable shaft, a cutting blade mounted on said shaft composed entirely of a flexible urethane elastomer, said blade having outwardly extending arms with cutting edges and non-cutting surfaces, said arms having means on at least one non-cutting surface for increasing their flexibility.

2. The blade of claim 1 in which said means consist of grooves.

3. The blade of claim 1 in which said means include a plurality of longitudinally extending ridges.

4. The blade of claim 1 in which said means include grooves and longitudinally extending ridges.

References Cited

UNITED STATES PATENTS 3,156,082 11/1964 Joyner _____ 56—295
3,176,455 4/1965 Buchanan _____ 56—295

ABRAHAM G. STONE, *Primary Examiner.*

P. A. RAZZANO, *Assistant Examiner.*